(12) United States Patent
Gong et al.

(10) Patent No.: US 7,978,725 B2
(45) Date of Patent: Jul. 12, 2011

(54) DYNAMIC MODIFICATION OF CONTENTION-BASED TRANSMISSION CONTROL PARAMETERS ACHIEVING LOAD BALANCING SCHEME IN WIRELESS MESH NETWORKS

(75) Inventors: Xiaohong Gong, Milpitas, CA (US); Brian Donald Hart, San Jose, CA (US); Bretton Lee Douglas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1023 days.

(21) Appl. No.: 11/369,159

(22) Filed: Mar. 6, 2006

(65) Prior Publication Data

US 2007/0206547 A1 Sep. 6, 2007

(51) Int. Cl.
*G06F 11/00* (2006.01)
*G06F 15/173* (2006.01)
(52) U.S. Cl. .................... 370/445; 370/238; 709/241
(58) Field of Classification Search .................. 370/406, 370/401, 392, 400, 352, 338, 331, 230, 686.6, 370/310, 408–420, 350, 431–465, 237–238.1; 709/220–222, 238–244, 202
See application file for complete search history.

(56) References Cited

U.S. PATENT DOCUMENTS

| | | | | |
|---|---|---|---|---|
| 6,917,606 | B2 * | 7/2005 | Sashihara | 370/338 |
| 7,095,732 | B1 * | 8/2006 | Watson, Jr. | 370/346 |
| 2003/0179742 | A1 * | 9/2003 | Ogier et al. | 370/351 |
| 2003/0189948 | A1 * | 10/2003 | Sashihara | 370/445 |
| 2005/0078656 | A1 * | 4/2005 | Bryant et al. | 370/351 |
| 2005/0220054 | A1 * | 10/2005 | Meier et al. | 370/331 |
| 2005/0233704 | A1 * | 10/2005 | Maekawa | 455/69 |
| 2006/0056382 | A1 * | 3/2006 | Yamada et al. | 370/349 |
| 2006/0109787 | A1 * | 5/2006 | Strutt et al. | 370/235 |
| 2006/0198346 | A1 * | 9/2006 | Liu et al. | 370/338 |
| 2006/0227801 | A1 * | 10/2006 | Nanda et al. | 370/447 |
| 2006/0245424 | A1 * | 11/2006 | Ramanathan et al. | 370/389 |

OTHER PUBLICATIONS

Aguayo, et al. *Link-level Measurements from an 802.11b Mesh Network*, MIT Computer Science and Artificial Intelligence Laboratory, Carnegie Mellon University, SIGCOMM'04, Aug. 30-Sep. 3, 2004, Portland, Oregon (11 pages).

Fu, et al., *The Impact of Multihop Wireless Channel on TCP Throughput and Loss*, UCLA Computer Sciences Department, Los Angeles, CA, O-7803-7753-2/03/$17.00 © 2003 IEEE, IEEE INFOCOM 2003 (10 pages).

Valera, et al., *Cooperative Packet Caching and Shortest Multipath Routing in Mobile Ad hoc Networks*, Department of Computer Science, School of Computing, National University of Singapore, Institute for Communications Research, Singapore, O-7803-7753-2/03/$17.00 © 2003 IEEE, IEEE INFOCOM 2003 (10 pages).

Mao, Shiwen, et al., *Video Transport Over Ad Hoc Networks: Multistream Coding with Multipath Transport*, IEEE Journal on Selected Areas in Communications, vol. 21, No. 10, Dec. 2003 (pp. 1721-1737) (16 pages).

(Continued)

*Primary Examiner* — Aung S Moe
*Assistant Examiner* — Prince Mensah
(74) *Attorney, Agent, or Firm* — Baker Botts L.L.P.

(57) ABSTRACT

Methods, apparatuses and systems directed to facilitating load balancing and bandwidth allocation in wireless mesh networks. Generally, according to one implementation of the present invention, routing nodes implement a contention-based media access mechanism and self-allocate bandwidth within a wireless mesh network by dynamically modifying one or more contention-based transmission control parameters. The routing nodes determine a hop count and adjust one or more contention parameters based at least in part on the hop count.

17 Claims, 4 Drawing Sheets

OTHER PUBLICATIONS

Draves, Richard, et al., *Comparison of Routing Metrics for Static Multi-Hop Wireless Networks*, Microsoft Research, SIGCOMM '04, Aug. 30-Sep. 3, 2004, Portland, Oregon (12 pages).

Ganesan, Deepak, et al., *Highly Resilient, Energy-Efficient Multipath Routing in Wireless Sensor Networks*, Computer Science Department, UCLA; International Computer Science Institute, Berkeley; ACIRI, Berkeley; Mobile Computing and Communications Review, vol. 1, No. 2, 2001 (pp. 1-13) (13 pages).

Liang, Yibin, *Multipath "Fresnel Zone" Routing for Wireless Ad Hoc Networks*, Thesis submitted to the Faculty of the Virginia Polytechnic Institute and State University, Mar. 4, 2004 (72 pages).

He, Tian, et al., *A Spatiotemporal Communication Protocol for Wireless Sensor Networks*, IEEE Transactions on Parallel and Distributed Systems, vol. 16, No. 10, Oct. 2005 (pp. 995-1006) (11 pages).

Aoki, et al., *802.11 TGs Simple Efficient Extensible Mesh (SEE-Mesh) Proposal*, IEEE 802.11-05/0562r2, Nov. 7, 2005 (153 pages).

Hong, Xiaoyan, et al., *Load Balanced, Energy-Aware Communications for Mars Sensor Networks*, Computer Science Department, UCLA; NASA Jet Propulsion Laboratory; 0-7803-7231-X/02/2002 IEEE, IEEEAC paper #194, Updated Dec. 2, 2001 (7 pages).

Stojmenovic, Ivan, et al. *Design Guidelines for Routing Protocols in Ad Hoc and Sensor Networks with a Realistic Physical Layer*, Topics in Ad Hoc Networks, IEEE Communications Magazine, Mar. 2005 (pp. 101-106) (5 pages).

Stojmenovic, Ivan, *Power-Aware Localized Routing in Wireless Networks*, IEEE Transactions on Parallel and Distributed Systems, vol. 12, No. 10, Oct. 2001 (12 pages).

Tian, Ye, et al. *TCP in Wireless Environments: Problems and Solutions*, IEEE Radio Communicaitons, Mar. 2005 (pp. S27-S32) (5 pages).

Muruganathan, Siva D., et al., *A Centralized Energy-Efficient Routing Protocol for Wireless Sensor Networks*, IEEE Radio Communicaitons, Mar. 2005 (pp. S8-S13) (5 pages).

Niculescu, Dragos, *Communication Paradigms for Sensor Networks*, Topics in Ad Hoc Networks, NEC Laboratories America, IEEE Communications Magazine, Mar. 2005 (pp. 116-122) (6 pages).

Bruno, Raffaele, et al., *Mesh Networks: Commodity Multihop Ad Hoc Networks*, Topics in Ad Hoc Networks, IEEE Communications Magazine, Mar. 2005 (pp. 123-131) (8 pages).

Zhang, Boaxian, *QoS Routing for Wireless Ad Hoc Networks: Problems, Algorithms, and Protocols*, Topics in Ad Hoc Networks, IEEE Communications Magazine, Oct. 2005 (pp. 110-117) (7 pages).

Haenggi, Martin, et al., *Routing in Ad Hoc Networks: A Case for Long Hops*, Topics in Ad Hoc Networks, IEEE Communications Magazine, Oct. 2005 (pp. 93-101) (8 pages).

Dixit, Sudhir, et al., *On the Design of Self-Organized Cellular Wireless Networks*, Advances in Self-Organizing Networks, IEEE Communications Magazine, Jul. 2005 (pp. 86-93) (7 pages).

Buchegger, Sonja, et al., *Self-Policing Mobile Ad Hoc Networks by Reputation Systems*, Advances in Self-Organizing Networks, IEEE Communications Magazine, Jul. 2005 (pp. 101-107) (6 pages).

Zhang, Xin, et al., *Energy-Aware On-Demand Scatternet Formation and Routing for Bluetooth-Based Wireless Sensor Networks*, Topics in Ad Hoc Netowrking, IEEE Communications Magazine, Jul. 2005 (pp. 126-133) (7 pages).

Villasenor-Gonzalez, Luis, et al. *HOLSR; A Hierarchical Proactive Routing Mechanism for Mobile Ad Hoc Networks*, Topics in Ad Hoc Networking, IEEE Communications Magazine, Jul. 2005 (pp. 118-125) (7 pages).

Goussevskaia, Olga, et al., *Data Dissemination Based on the Energy Map*, Topics in Ad Hoc Networking, IEEE Communications Magazine, Jul. 2005 (pp. 134-143) (9 pages).

Williams, Chris, et al., *Personal Area Technologies for Internetworked Services*, IEEE Radio Communications, Dec. 2004 (pp. S15-S26) (11 pages).

Opperman, Ian, et al., *UWB Wireless Sensor Networks: UWEN—A Practical Example*, IEEE Radio Communications, Dec. 2004 (pp. S27-S32) (5 pages).

Sirivianos, Michael, et al., *Comparative Evaluation of Ad Hoc Routing Protocols in Highly Dynamic Environments*, University of California, San Diego (16 pages).

De Silva, Saman, et al., *On the Impact of Noise Sensitivity on Performance in 802.11 Based Ad Hoc Networks*, Computer Science Department, The University of Texas as San Antonio (5 pages).

Veres, Andras, et al., *Supporting Service Differentiation in Wireless Packet Networks Using Distributed Control*, IEEE Journal on Selected Areas in Communications, vol. 19, No. 10, Oct. 2001 (12 pages).

Kerry, Stuart J., et al. *Amendment: Medium Access Control (MAC) Quality of Service (QoS) Enhancements*, Part 11: Wireless LAN Medium Access Control (MAC) and Physical Layer (PHY) specifications. IEEE Standard for Information Technology, IEEE P802.11e/D13.0, Jan. 2005 (182 pages).

\* cited by examiner

Fig._1

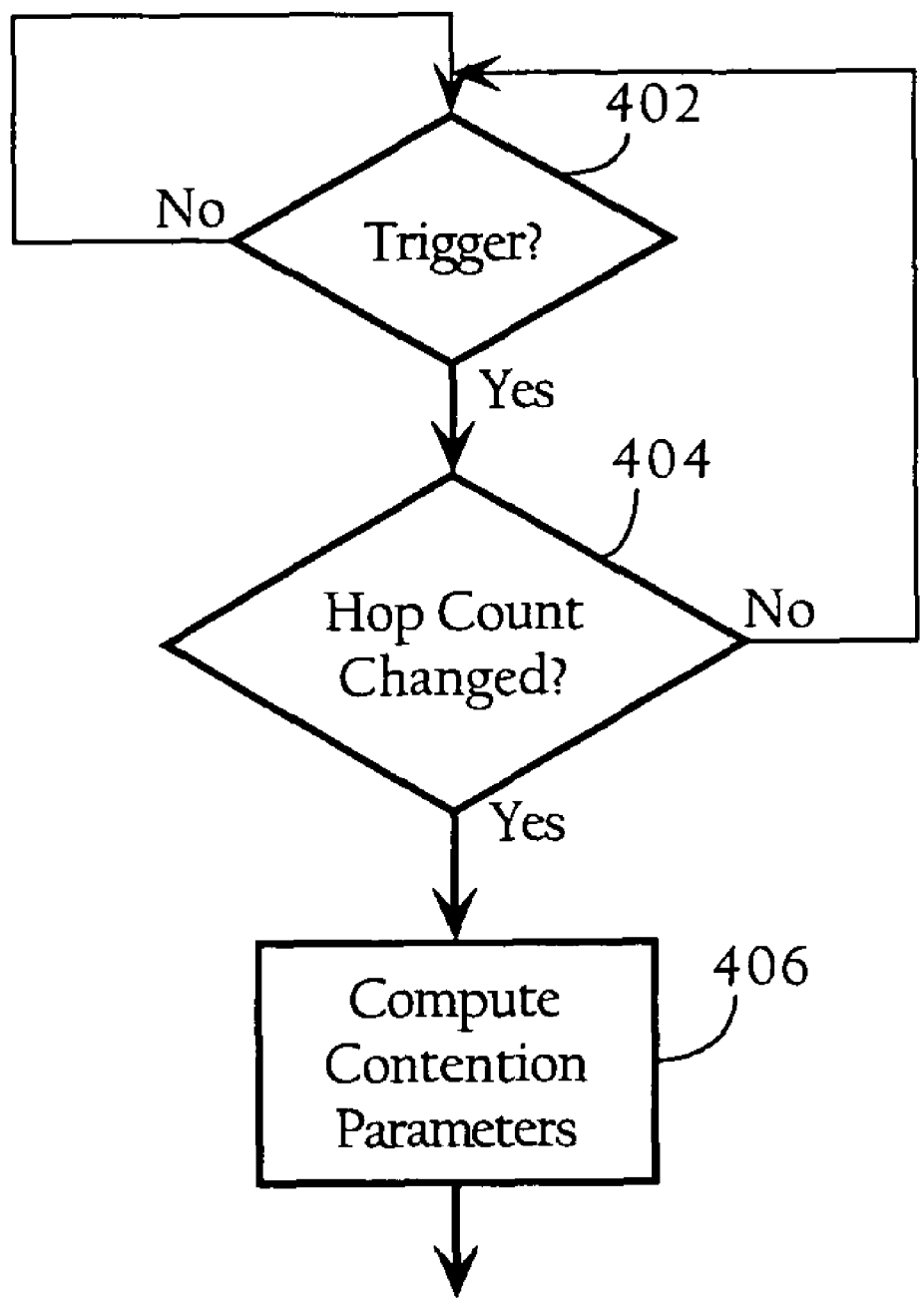
Fig._4

DYNAMIC MODIFICATION OF CONTENTION-BASED TRANSMISSION CONTROL PARAMETERS ACHIEVING LOAD BALANCING SCHEME IN WIRELESS MESH NETWORKS

CROSS-REFERENCE TO RELATED APPLICATIONS AND PATENTS

This application makes reference to the following commonly owned U.S. patent applications and/or patents, which are incorporated herein by reference in their entirety for all purposes:

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 11/213,287 in the name of Neal Dante Castagnoli and Robert J. Friday, entitled "Automatic Route Configuration in Hierarchical Wireless Mesh Networks."

FIELD OF THE INVENTION

The present invention relates to wireless networks and, more particularly, to methods, apparatuses, and systems directed to load balancing and bandwidth allocation among routing nodes in wireless mesh networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles, across the globe. Indeed, WLANs are rapidly changing from convenience networks to business-critical networks. Increasingly, users are depending on WLANs to improve the timeliness and productivity of their communications and applications, and in doing so, require greater visibility, security, management, and performance from their networks.

Wireless mesh networks have become increasingly popular. A typical wireless mesh network consists of mesh access points (e.g., Cisco SkyCaptain mesh access points) and wireless clients. To construct self-forming and self-healing multi-hop Wireless mesh networks, each mesh access point finds a route back to the root node. Thus, a routing protocol is essential for the operations of wireless mesh networks.

Traditionally, routing protocol designs follow a strict layered approach, where routing decisions are made based only on information available at the network layer. For instance, many routing protocols for wireless mesh networks use minimum hop counts as the routing metric. A hop count is the number of routing nodes (also referred to as mesh access points, links, or hops) through which a packet travels to reach the root node. While utilizing hop count as a routing metric works well in wired networks, such an approach may suffer from performance degradation in wireless networks, especially in multi-hop wireless mesh networks. Two factors contribute to such performance degradation: 1) wireless links are versatile and interference is time-varying; and 2) contention based wireless media access control (MAC) protocols introduce uncertainties in the system performance. If only network layer information such as the hop count is considered, the resulting routing configuration may cause some routing nodes in the mesh to be heavily congested and thus may adversely affect end-to-end throughput.

In addition, the IEEE Communications Magazine has been actively publishing tutorial papers on mesh networks, routing over mesh networks, QoS routing, load balancing routing, and the metrics used therein. However, such metrics presently do not include end-to-end packet delivery ratio. Some routing protocols use signal-to-noise ratio (SNR) as a routing metric. However, one problem with merely using SNR as a routing metric is that it does not take into account inter-hop interference, congestion level, and hop count. Some routing protocols may combine SNR and hop count but such a combination still does not solve the congestion and interference problem.

A problem with existing routing protocols is that they fail to choose routes with the maximum end-to-end throughput. For instance, a metric may view a two-hop route with high SNR as better than a one-hop route with medium SNR, but this does not maximize end-to-end throughput. Furthermore, routing decisions based on SNR are generally approximated by being "too poor" or "good enough." As such, once the "good enough" SNR state is reached, there is no strong correlation between packet delivery probability and SNR, which in turn implies that SNR may not be a good predictive tool. This feature is recognized by the nonlinear SNR mapping found in the "Ease" metric. The mapping resembles a smoothed binary decision. In the "zero" region, the mapping is near zero then steeply rises towards the transition point. In the "one" region, the mapping climbs much more slowly. However, presumably for implementation ease, the shape of the mapping near the transition region does not closely match the packet delivery probability shape.

Cross-layer design techniques have been widely applied to many areas of routing, such as quality of service (QoS) routing, load balancing routing, power-aware routing, etc. In mobile ad hoc networks (MANET), load balancing routing is often combined with QoS routing because voice and video applications utilize the User Datagram Protocol (UDP) for packet delivery. Since UDP does not have inherent flow control and congestion control schemes, load balancing to avoid congestion becomes a challenging problem. The most advanced and well-studied approach is to utilize multiple paths for routing, where two or more routes are set up simultaneously between the source routing node and the destination root node. This allows traffic to flow from source routing node to the root node on all available routes. The source routing node determines what percentage of a flow can be routed to each route. When one route experiences congestion, the source routing node is notified, and the congested route is then assigned a lesser percentage of the total traffic flow. Even though this type of multiple-path load balancing approach is robust against congestion, it requires a more sophisticated routing scheme, which increases implementation complexity and cost. In addition, care has to be taken at the end routing nodes to synchronize flows on different routes. Furthermore, the out-of-order packets may have to be re-arranged at the destination.

An alternative way to achieve load balancing is to allow congested routing nodes to transmit control packets to inform their neighboring routing nodes of the congestion situation. This idea was first proposed by He, Stankovic, Lu, and Abdelzaher to solve the congestion problem in wireless sensor networks. Because wireless sensor networks share the same topology as wireless mesh networks, this idea has also been adopted to solve the congestion problem in wireless mesh networks. The basic procedure operates as follows: Each routing node monitors its own congestion level. When the congestion level is above a certain threshold, the load balancing procedure is triggered and a "back-pressure" packet is sent to neighboring routing nodes. Upon receiving the back-pressure packet, a routing node takes appropriate steps to help reduce congestion until being further notified. Utilizing back-pressure routing, a routing node re-routes its packets through other neighboring routing nodes if its downstream routing node on the current route experiences congestion. A problem with the back-pressure routing scheme is that it is primarily directed to avoiding congestion rather than to achieving maximum end-to-end throughput.

An intra-mesh congestion control protocol proposed by Intel Corporation® utilizes a metric based on local queue size to monitor congestion. When the backpressure builds up significantly at the local routing node, the routing node informs its upstream neighbors by sending "Congestion Control Request" messages so that the recipient routing nodes can decrease their transmission rate accordingly. Upon receiving the back-pressure packet, the upstream routing nodes do not choose a different route to transmit. Instead, they may have to transmit at the reduced rate during an extended period. Consequently, the end-to-end throughput may be reduced.

Other load-balancing routing protocols have also been proposed for wireless sensor networks. However, in sensor networks, power preservation is the main goal whereas achieving higher end-to-end throughput is less important.

In light of the foregoing, a need in the art exists for methods, apparatuses, and systems that address the foregoing problems and that facilitate load balancing in wireless mesh networks. Embodiments of the present invention substantially fulfill this need.

DESCRIPTION OF THE DRAWINGS

FIG. 4 is a flow chart illustrating a process flow, according to one implementation of the present invention, associated with computing contention parameters.

DESCRIPTION OF PREFERRED EMBODIMENT(S)

A. Overview

Figure 1:
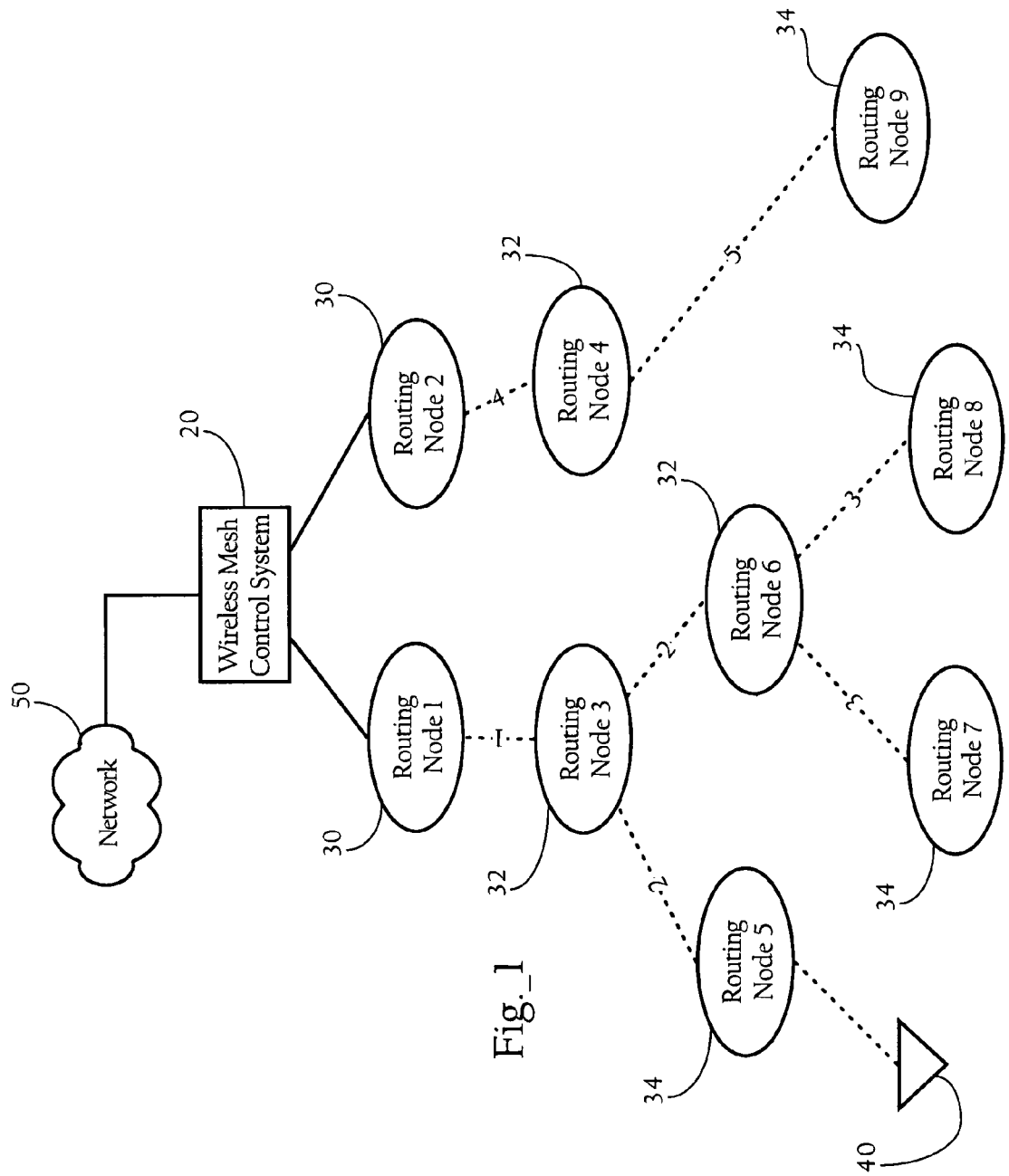
FIG. 1 is a functional block diagram that illustrates a hierarchical wireless mesh network according to an implementation of the present invention.

The present invention provides methods, apparatuses, and systems directed to load balancing and bandwidth allocation in wireless mesh networks. Generally, according to one implementation of the present invention, routing nodes employ a contention-based media access scheme (such as the Carrier Sense Multiple Access with Collision Avoidance (CSMA/CA), and Enhanced Distributed Controlled Access (EDCA)) and self-allocate bandwidth within a hierarchical wireless mesh network by dynamically modifying one or more contention-based transmission control parameters (contention parameters). In one implementation, each routing node modifies its contention parameters associated with a given class of traffic (such as data traffic). The values of the contention-based transmission control parameters are based on hop count, where hop count is the number of hops from the instant routing node to the root node in the hierarchical wireless mesh network. Generally, routing nodes at higher levels in the hierarchical mesh network (in other words, those closer to the root node) experience higher load as they must also forward traffic to and from routing nodes at lower levels of the hierarchy. As described in more detail below, in one implementation, some routing nodes such as those with lower hop counts transmit packets on average more aggressively (as determined by more aggressive contention-based transmission control parameters) than routing nodes with higher hop counts thereby balancing the load of the wireless network. As a result, higher-level (i.e., upstream) routing nodes are allowed on average a higher throughput capacity/bandwidth than lower-level (i.e., downstream) routing nodes. In other words, higher-level routing nodes are given a higher priority than lower-level routing nodes.

In a contention-based coordination scheme (such as the enhanced distributed controlled access (EDCA) media access control (MAC) layer parameters defined in the IEEE 802.11e draft standard), the MAC layer will check the physical and virtual carrier sense mechanisms for an indication that the medium is free for a fixed period (in EDCA, an arbitrated inter-frame space AIFS) and that the MAC back-off timer has expired. If these conditions are met, the MAC can transmit. If the wireless medium is busy at the time of attempted transmission, the MAC will defer until the wireless medium is free, and then wait for a fixed period of time and a back-off period before attempting transmission. Generally, the back-off period includes a random element. That is, the back-off period is randomly chosen according to a uniform distribution of time slots between 0 and a contention window (CW). CW is initially assigned a minimum value, and is doubled after a transmission fails up to a maximum value. In EDCA, the contention-based parameters discussed above differ across different priority or access classes, providing more aggressive parameters to higher priority traffic and less aggressive parameters to low priority traffic.

As described in more detail below, in one implementation, implementations of the present invention modify at least one of the contention parameters associated with one or more priority or access classes. As discussed above, one contention parameter is referred to as an arbitration interframe space (AIFS). Another contention parameter is referred to as a minimum contention window ($CW_{min\_h}$). In one implementation, $CW_{min\_h}$ defines an initial upper limit of an interval range within which a routing node waits, or backs off, before transmitting a packet for the first time or before retransmitting a packet that has failed to successfully transmit. Another contention parameter is referred to as a maximum contention window ($CW_{max\_h}$). In one implementation, $CW_{max\_h}$ defines a maximum upper limit to which CW may increase. As described below, routing nodes in the wireless mesh self allocate bandwidth (for at least one access class) by computing one or more of these EDCA parameters for one or more access classes. In one implementation, these computations are executed after the routing node has selected a parent routing node in the hierarchal mesh and determined its hop count to the root node.

The bandwidth allocation implementations described above may operate in conjunction with various routing schemes. For example, as described below, in one implementation, routing nodes in a wireless mesh network combine metrics corresponding to the link and network layers to select a route to a root node in the wireless mesh network. In one implementation, for each neighbor, a given routing node computes a routing metric, which is based on the computed route cost and hop count, and selects a preferred neighbor as the parent routing node based on the best routing metric. As described in more detail below, after the routing nodes have established parent routing nodes, the routing nodes may employ a contention-based media access scheme, such as CSMA/CA and/or EDCA, and self-allocate bandwidth within the wireless mesh network by dynamically modifying one or more contention parameters.

B. Exemplary Wireless Mesh Network System Architecture

B.1. Mesh Network Topology

For didactic purposes, an embodiment of the present invention is described as operating in a hierarchical wireless mesh network illustrated in FIG. 1. The present invention, however, can operate in a wide variety of hierarchical mesh network configurations. FIG. 1 illustrates a wireless mesh network according to an implementation of the present invention. In one implementation, the wireless mesh network includes a wireless mesh control system 20, and a plurality of routing nodes. In one implementation, implementations of the present invention achieve a hierarchical architectural routing overlay imposed on the mesh network of routing nodes to create a downstream direction towards leaf routing nodes 34, and an upstream direction toward the root nodes 30. For example, in the hierarchical mesh network illustrated in FIG. 1, first hop routing node 1 30 is the parent of intermediary routing node 3 32. In addition, intermediate routing node 3 32 is the parent to leaf routing node 5 34 and intermediate routing node 6 32. In one implementation, this hierarchical relationship is used in routing packets between wireless clients 40, or between wireless clients 40 and network 50. In the wireless mesh network illustrated in FIG. 1, the routing nodes are arranged in two hierarchical tree structures one root node is routing node 1, while the other root node is routing node 2. Of course, a variety of hierarchical configurations are possible including a fewer or greater number of hierarchical tree structures. Still further, the hierarchical configuration may be dynamic in that the parent and child relationships between routing nodes may change depending on factors such as congestion, node failures, and the like. As discussed in more detail below, implementations of the present invention allow for automatic configuration of the hierarchical routing overlay. In addition, some implementations of the present invention adapt to changing conditions of the hierarchical mesh network, such as RF interference, node failures and the like.

The routing nodes in the mesh network, in one implementation, generally include one radio, operating in a first frequency band, and an associated wireless communication functionality to communicate with other routing nodes to thereby implement the wireless backbone, as discussed more fully below. All or a subset of the routing nodes, in one implementation, also include an additional radio, operating in a second, non-interfering frequency band, and other wireless communication functionality to establish and maintain wireless connections with mobile stations, such as wireless client 40. For example, in 802.11 wireless networks, the backbone radios on the wireless routing nodes may transmit wireless packets between each other using the 802.11a protocol on the 5 GHz band, while the second radio on each wireless node may interact with wireless clients on the 2.4 GHz band (802.11b/g). Of course, this relation can also be reversed with backhaul traffic using the 802.11b/g frequency band, and client traffic using the 802.11a band. In other implementations, however, a single radio (and frequency band) is used to support both backbone and client traffic.

In one implementation, the backbone or backhaul radios of routing nodes for a given tree are set to the same channel within the backhaul frequency band. Collectively, the routing nodes, in one implementation, use the Carrier Sense Multiple Access with Collision Avoidance (CSMA/CA) disclosed in the IEEE 802.11 standard to coordinate transmissions in the wireless mesh. Other contention-based transmission mechanisms can also be used. Additionally, a variety of channel assignment schemes can be used. For example, for a given routing node, the operating channel for upstream data transfer, in one implementation, can be different than the operating channel used for downstream data transfer. For example, wireless transmissions between routing node 1 and routing node 3 can occur on channel 1, while routing node 3 communicates with routing node 5 and routing node 6 on channel 2. In one implementation, the upstream and downstream channels assigned to a given routing node are non-overlapping channels, while in other implementations they are overlapping channels. In one implementation, the channel assignments between routing nodes are statically configured. In other implementations, operating channels can be dynamically assigned. However, this channel assignment scheme is not required by the present invention. In other implementations, all routing nodes in the mesh network operate on the same channel within the backhaul frequency band.

As discussed more fully below, each routing node in the mesh network, in one implementation, is operative to transmit and receive packets from other routing nodes according to a mesh routing hierarchy. Each mesh routing node, in one implementation, is further operative to establish and maintain wireless connections to one or more wireless client devices 40. A mesh network control system 20, in one implementation, is operative to monitor which routing node that each wireless client is associated and operative to route packets destined for the wireless clients to the wireless routing node to which the client is associated.

B.2. Mesh Routing Node Configuration

Figure 2:
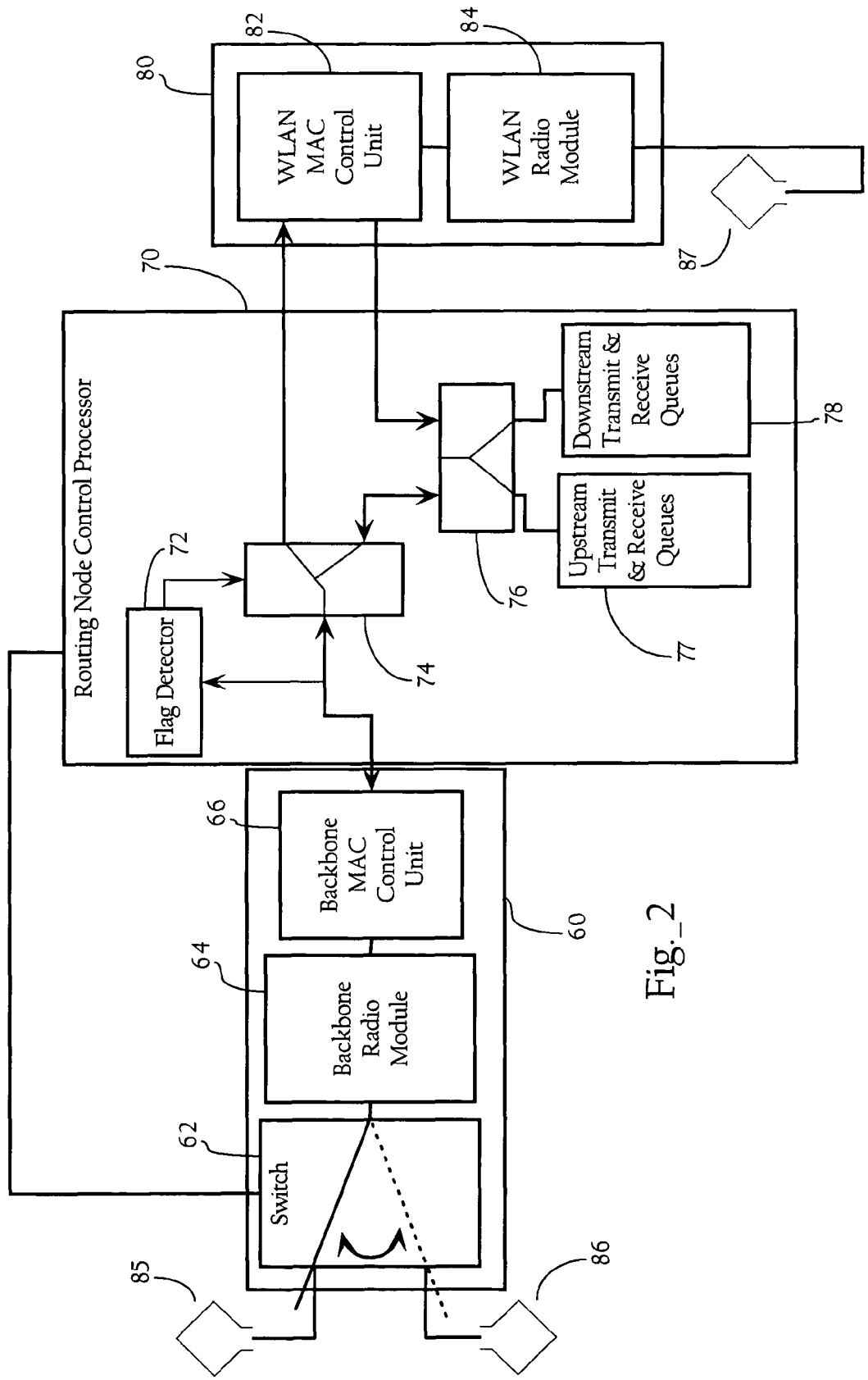
FIG. 2 is a schematic diagram illustrating the logical configuration, according to one implementation of the present invention, of a wireless routing node.

The following describes, for didactic purposes, the configuration of a mesh routing node according to one implementation of the present invention. Other routing node configurations are possible. FIG. 2 is a schematic diagram illustrating the logical and/or functional components of a routing node according to one implementation of the present invention. The routing node illustrated in FIG. 2 includes a wireless backbone interface unit 60 operating in a first frequency band, and a WLAN interface unit 80 operating in a second frequency band. Specifically, as FIG. 2 illustrates, a mesh routing node generally comprises routing node control processor 70, wireless backbone interface unit 60, and WLAN interface unit 80. In one implementation, the routing node control processor 70, wireless backbone interface unit 60, and WLAN interface unit 80 are operably connected to each other via a system bus. Wireless back bone interface unit 60 is operative to transfer wireless frames to upstream (parent) and downstream (child) routing nodes under the control of routing node control processor 70, as discussed more fully below. WLAN interface unit 80, in one implementation, is operative to transfer wireless frames to and from wireless clients 40 under control of routing node control processor 70.

Wireless backbone interface unit 60, in one implementation, comprises first and second antennas 85 and 86, switch 62, backbone radio module 64, and backbone MAC control unit 66. In other implementations using a single omni-directional antenna, switch 62 is not required. Backbone radio module 64 includes frequency-based modulation/demodulation functionality for, in the receive direction, demodulating radio frequency signals and providing digital data streams to backbone MAC control unit 66, and in the transmit direction, receiving digital data streams and providing frequency modulated signals corresponding to the digital data stream. In one embodiment, radio module 64 is an Orthogonal Frequency Division Multiplexed (OFDM) modulation/demodulation unit. Of course, other modulation and multiplexing technologies can be employed, such as Frequency Hopping Spread Spectrum (FHSS) or Direct Sequence Spread Spectrum (DSSS). Backbone MAC control unit 66 implements data link layer functionality, such as detecting individual frames in the digital data streams, error checking the frames, and the like. In one embodiment, backbone MAC control unit 66 implements the 802.11 wireless network protocol (where 802.11, as used herein, generically refers to the IEEE 802.11 standard for wireless LANs and all its amendments). In one embodiment, the functionality described herein can be implemented in a wireless network interface chip set, such as an 802.11 network interface chip set. Of course, the present invention can be used in connection with any suitable radio-frequency-based wireless network protocol. Switch 62 switches between first antenna 85 and second antenna 86 under the control of routing node control processor 70.

WLAN interface unit 80 comprises WLAN MAC control unit 82, WLAN radio module 84, and at least one antenna 87. Similar to backbone interface unit 60, WLAN radio module 84 includes frequency-based modulation/demodulation functionality for, in the receive direction, demodulating radio frequency signals and providing digital data streams to WLAN MAC control unit 82, and in the transmit direction, receiving digital data streams and providing frequency modulated signals corresponding to the digital data stream. In one embodiment, WLAN radio module 84 is an Orthogonal Frequency Division Multiplexed modulation-demodulation unit. In one embodiment, radio module 84 implements the OFDM functionality in a manner compliant with the IEEE 802.11a or the 802.11g protocol, and operates in either the 5 GHz or 2.4 GHz band, respectively. WLAN radio module 84 may also operate in a manner consistent with the 802.11b protocol employing DSSS data transmission schemes. However, as discussed above, the frequency band in which the radio module 84 operates is configured, in one implementation, to be non-interfering relative to the backbone radio module 64. WLAN MAC control unit 82 implements data link layer functionality, such as detecting individual frames in the digital data streams, error checking the frames, and the like. In one embodiment, WLAN MAC control unit 82 implements the 802.11 wireless network protocol. Other suitable wireless protocols can be used in the present invention. In one embodiment, the functionality described herein can be implemented in a wireless network interface chip set, such as an 802.11 network interface chip set. Still further, WLAN interface unit 80, in one implementation, includes fast path and slow path transmit queues to allow high priority traffic (e.g., management frames) to have better or prioritized access to the communications medium over regular network traffic. Wireless backbone interface unit 60 may have similar priority functionality as well.

As discussed above, wireless backbone interface unit 60 and WLAN interface unit 80, in one implementation, operate in different frequency bands. For example, in one embodiment, backbone radio module 64 implements the OFDM encoding scheme in a manner compliant with the IEEE 802.11a protocol and, thus, operates in the 5 GHz band. WLAN radio module 84 operates in the 2.4 GHz band in a manner consistent with either the 802.11b and/or 802.11g protocol. The use of different frequency bands for wireless backbone traffic and client traffic ensures that wireless client traffic does not substantially affect or disrupt operation of the wireless backbone implemented by the routing nodes. Of course, other schemes are possible, as the selection of frequency bands for wireless backbone traffic and wireless traffic between clients and routing nodes is a matter of engineering choice. In other implementations, different non-overlapping channels within the same band can be used for wireless backbone traffic and client traffic. In other embodiments, each routing node can include only a single radio for both the backhaul and client traffic. In yet other embodiments, the routing nodes may include more than two radios.

FIG. 2 also illustrates the logical configuration of routing node control processor 70. Routing node control processor 70, in one implementation, generally refers to the hardware modules (e.g., processor, memory), software modules (e.g., drivers, etc.) and data structures (e.g., frame buffers, queues, etc.) that control operation of the routing node. In one implementation routing node control processor 70 generally comprises a processor (e.g., a Central Processing Unit (CPU), etc.), a memory (e.g., RAM, EPROMS, etc.), and a system bus interconnecting the memory, the processor and the network interfaces. Routing node control processor 70 may further comprise an operating system and one or more software modules and/or drivers for implementing the functions described herein. Routing node control processor 70, as discussed above, controls the operation of wireless backbone interface unit 60 and WLAN interface unit 80, both of which may reside on network cards operably connected to the system bus. In one implementation, routing node control processor 70 is operative to control the operation of wireless backbone interface unit 60 coordinate the transmission of frames in the upstream and downstream directions. In one implementation, the routing node control processor 70 may implement an upstream and downstream phase. During the downstream phase, the routing node communicates with child routing nodes. In the upstream phase, the routing node communicates with the parent routing node.

As discussed above, wireless backbone interface unit 60, in the receive direction, provides wireless frames received at first antenna 85 or second antenna 86 and transmitted to routing node control processor 70. Flag detector 72, in one implementation, is operative to inspect wireless frames received from other routing nodes, and to determine whether the wireless frames should be forwarded along the wireless backbone or to a wireless client associated with the instant routing node via WLAN interface unit 80. In response to control signals transmitted by flag detector 72, logical switch 74 transmits the wireless packets along a WLAN path to WLAN interface unit 80, or along a wireless backbone path to the upstream or downstream queues 77 and 78. As FIG. 2 illustrates, routing node control processor 70 also includes logical switch 76 that switches between upstream transmit and receive queues 77 and downstream transmit and receive queues 78 depending on the current operational phase or mode. For example, wireless frames received from a parent routing node during an upstream phase are buffered in the downstream transmit/receive queues 78 for transmission to a child routing node for transmission during the downstream phase. Oppositely, wireless frames received from a child routing node during the downstream phase are buffered in the parent slot queue 77 for transmission to the parent routing node during the upstream phase. In one implementation, routing node control processor 70 maintains separate transmit and receive queues for each of the parent and child routing nodes to which the current node is associated. In the transmit direction, logical switch 76 switches between the downstream and upstream queues depending on the transmission phase. In one implementation, both the upstream and downstream queues 77 and 78 may include separate queuing structures to achieve a variety of purposes. For example, routing node control processor 70 may be configured to include fast path and slow path queues for each of the upstream and downstream queues 77 and 78. Still further, the routing node control processor 70 can be configured to omit an upstream and downstream transmission phase, relying instead on link-layer contention-based mechanisms to coordinate transmission between parent and child routing nodes.

As discussed above, routing node control processor 70 is operative to switch between first and second antennas 85 and 86. First antenna 85, in one implementation, can be used for data transfer with a parent routing node, while second antenna 86 can be used for transfer with one or more child routing nodes. In one embodiment, first and second antennas 85 and 86 are directional antennas whose peak gains are oriented depending on the location of the parent and child routing nodes. For example, in one implementation, first antenna 85 is generally oriented in the direction of the parent routing node. Second antenna 86 is oriented in the general direction of one or more child routing nodes. In one implementation, the peak gain and beamwidth of the downstream directional antennas place an effective limit on the separation between the child routing nodes. However, in other implementations, the child and parent routing nodes are not associated with a particular antenna. As discussed more fully below, the antenna used to communicate with a given routing node can be determined during a neighbor discovery and maintenance process. Antennas 85 and 85 can be any suitable directional antennas, such as patch antennas, yagi antennas, parabolic, and dish antennas. In one embodiment, the peak gains of the antennas are offset from one another in a manner that maximizes coverage in all directions. In another implementation, an omni-directional antenna can be used in place of first and second antennas 85 and 86. Of course, a plurality of omni-directional antennas can also be used in connection with spatial antenna pattern diversity schemes to ameliorate multipath effects in indoor and outdoor systems.

In one embodiment, the routing nodes include functionality allowing for detection of the signal strength and other attributes of the signal received from neighboring routing nodes. For example, the IEEE 802.11 standard defines a mechanism by which RF energy is measured by the circuitry (e.g., chip set) on a wireless network adapter or interface card. The 802.11 protocol specifies an optional parameter, the received signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is typically an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendors wireless network adapter will range between 0 and RSSI_Max. Resolving a given RSSI value reported by a given vendor's chip set to an actual power value (dBm) can be accomplished by reference to a conversion table. In addition, some wireless networking chip sets also report received signal strength in SNR which is the ratio of Signal to Noise, rather than or in addition to RSSI which is an absolute estimate of signal power. Many chip sets include functionality and corresponding APIs to allow for a determination of signal-to-noise ratios (SNRs) associated with packets received on the wireless network interfaces. As discussed more fully below, detected signal attribute information can be used in automatically configuring the mesh network.

Root nodes 30 and leaf routing nodes 34 can include a subset of the functionality discussed above, since these routing nodes do not have either a parent or child routing node. For example, both root and leaf routing nodes 30 and 34 can each be configured to include a single directional, or omni-directional, antenna. Other functionality can also be omitted such as switch 62. In one implementation, however, each root or leaf routing node can include all the essential physical functionality discussed above, and be configured to operate in a root or leaf routing mode (as appropriate), where the downstream/upstream synchronization functionality is disabled. In that case, the leaf routing nodes 34, for example, operate in upstream mode waiting for their respective data slots. A configuration mechanism facilitates reconfiguration and extensions to the mesh network. For example, the wireless mesh network may be extended by simply adding additional routing nodes in the downstream direction of a leaf routing node and re-configuring the leaf routing node.

Other configurations are also possible. For example, the wireless routing node can include more than two directional antennas. For example, each backbone radio interface may be operably connected to four directional antennas, whose peak gains are each oriented at 90 degrees to each other. Still further, as discussed in more detail below, each routing node further comprises a neighbor state machine operative to discover and maintain data relating to neighboring routing nodes, as disclosed in U.S. application Ser. No. 11/213,287.

C. Local Link Layer and Network Layer Metrics

As described above, each routing node generates link layer metrics and network layer metrics corresponding to operation of the backhaul or backbone network interfaces. Link layer metrics are statistics measured at the data link layer and, in one implementation, may include a queued packet delivery ratio (QPDR) and a transmitted packet delivery ratio (TPDR). Network layer metrics are statistics measured at the network layer and, in one implementation, may include hop count. QPDR, TPDR, and hop count are described in detail below.

C.1. Queued Packet Delivery Ratio and Transmitted Packet Delivery Ratio

As described above, the QPDR measures the percentage of packets that are not dropped in a queue, and the TPDR measures the percentage of successful packet deliveries. These packet delivery ratios indicate the quality (e.g., congestion and interference levels) of a given routing node.

C.1.a. Queued Packet Delivery Ratio

As described above, the QPDR generally indicates the level of congestion at the link layer observed at a given routing node. More specifically, in one implementation, the QPDR is the ratio between the number of packets that are written onto the receive/inbound queue and the number of packets that are read onto the transmit/outbound queue, as shown in the following equation:

$$QPDR = \frac{\text{number of packets written onto the transmit queue}}{\text{number of packets read onto the recieve queue}}$$

The number of packets that are read onto the transmit/outbound queue represent the number of packets that are transmitted from a given routing node, which includes both successful transmissions and unsuccessful transmissions. The number of packets that are read onto the receive/inbound queue represent the number of packets that are received by the routing node. The QPDR can be a good indicator of the congestion level at a given routing node. A lower QPDR indicates that the routing node may be receiving more packets than it is transmitting (i.e., more coming in than going out). Congestion may cause the receive queues at a given routing node to overflow, requiring that packets be dropped prior to transmission. Furthermore, because very few packets can be relayed to the next hop when a routing node is heavily congested, some older packets, after a timeout, may be dropped. Accordingly, a routing node with a low QPDR is likely to be experiencing congestion and frequent incoming queue overflow, which is likely to cause the routing node to drop packets.

In one implementation, the queued packet drop rate at the routing node is 1-QPDR, as shown in the following equation:

$$\text{Drop rate} = 1 - \text{QPDR}$$

The throughput drops exponentially with the increase of the number of hops, and bandwidth is wasted if data packets are dropped at intermediate routing nodes. The more hops that a packet traverses before it is dropped, the more bandwidth is wasted. Hence, choosing good links not only helps to establish reliable routes but also improves end-to-end throughput, because fewer packets are likely to be dropped along the route.

C.1.b. Transmitted Packet Delivery Ratio

As described above, the TPDR measures the percentage of successful packet deliveries. More specifically, in one implementation, the TPDR is the ratio between the number of successfully transmitted packets and the number of transmitted packets (including re-transmissions), as shown in the following equation:

$$TPDR = \frac{\text{number of successfully transmitted packets}}{\text{number of packet transmission attempts}}$$

The number of packet transmission attempts represents the number of attempts to transmit wireless packets. In one implementation, the number of attempts may be an actual number of attempts. In another implementation, the number of attempts may be an estimated number of attempts. In one implementation, the estimated number of attempts may be computed based on the number of successful transmissions (i.e., where acknowledgement messages are received) plus the product of the number of packets dropped from the transmit queue and the configured retry limit after which packets are dropped, as shown in the following equation:

$$\text{Estimated attempts} = \text{number of successful transmissions} + (\text{number dropped packets from transmit queue} \ast \text{max retry limit})$$

The TPDR ratio is a good indicator of the link quality. The TPDR characterizes the percentage of successful packet deliveries in noisy and interference-limited environments. Under the collision avoidance mechanisms in the IEEE 802.11 MAC protocol, a routing node may defer if it detects an interfering source, in which case, the routing node may be considered to experience congestion. Furthermore, a routing node may be considered interference-limited if the routing node cannot detect the source of the interference, and/or if the interference corrupts the data transmission of the routing node.

As described above, in one implementation, the routing nodes may employ a smoothing function for QPDR and TPDR at the transmitting side and calculate long-term averages to smooth the packet delivery ratios. In one implementation, the routing nodes may apply a standard smoothing function such as weighted moving averages or exponential moving averages, as shown in the following equation:

$$D_{reported} = (1-\alpha)D_{past} + \alpha D_{current}$$

Alpha ($\alpha$) is a weighting factor and may be a user-defined value (e.g., $\alpha=0.75$) configured as a matter of engineering or design choice.

D. Preferred Neighbor/Route Selection Process

The QPDR and TPDR described above form certain elemental aspects of the route configuration process for selecting a neighboring routing node as a parent routing node for transmitting data packets upstream to the root node. As described above, in one implementation, neighboring routing nodes, or "neighbors," transmit hello messages, each of which contain a data structure containing a route cost, a hop count, and a node identification (node ID) to identify the transmitting routing node. Route cost and hop count are described in detail below. The neighbor or hello messages can be transmitted on a periodic basis. In one implementation, the routing nodes maintain the latest information received from hello messages transmitted from neighboring routing nodes in association with a time stamp.

Figure 3:
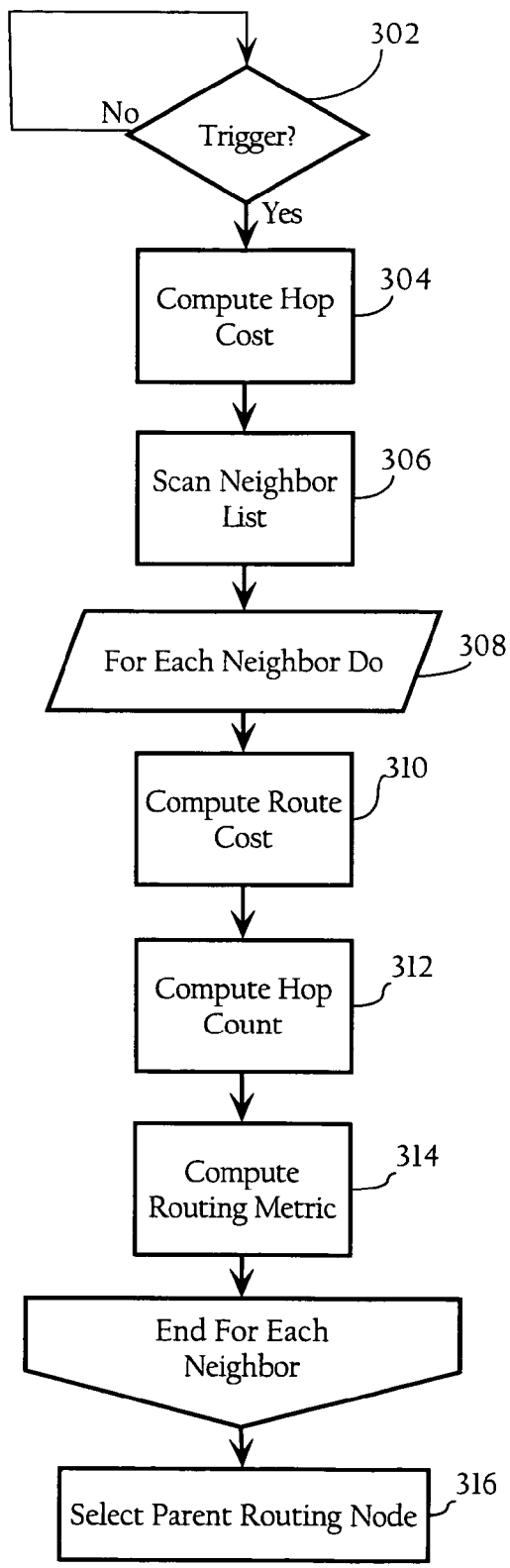
FIG. 3 is a flow chart illustrating a process flow, according to one implementation of the present invention, associated with the computation of routing metrics.

FIG. 3 is a flow chart illustrating a process flow, according to one implementation of the present invention, associated with the selection of a parent routing node. In one implementation, the process illustrated in FIG. 3 can be implemented after an initial neighbor discovery phase and, subsequently, during a routing maintenance phase. In one implementation, a routing node is triggered to begin the selection process by an event. In one implementation, the event may be the receipt of a hello message from a routing node. In another implementation, the event may be a periodic trigger signal (e.g., every second). Accordingly, each routing node determines if there is a trigger (302).

D.1. Hop Cost

As described above, in one implementation, each routing node, if triggered, independently computes its hop cost (304). In one implementation, the hop cost is the locally observed QPDR multiplied by the locally observed TPDR, as shown in the following equation:

$$\text{Hop cost} = \text{QPDR} \ast \text{TPDR}$$

The hop cost represents the ratio of successful deliveries at a given routing node, and may also be referred to as the success delivery ratio at the current hop (i.e., current routing node). In one implementation, each routing node computes its hop cost upon detection of the trigger and/or periodically (e.g., every 5 ms). In one implementation, the routing node accesses various MIB counters associated with the backhaul network interface to gather the requisite packet transmission statistics and compute the packet delivery ratios.

D.2. Scan Neighbor List

Each routing node then scans a neighbor list (306), which provides a list of neighboring routing nodes as detected by receipt of hello messages. In one implementation, each routing node stores information contained in the hello messages for processing. In one implementation, the neighbor list includes time stamps so that the routing node can determine whether the information corresponding to a given routing node is recent enough to be considered in the route selection processes described herein. For each qualifying neighbor (308), each routing node computes a route cost, a hop count, and a routing metric, as described in detail below. A qualifying neighbor, for example, can be a neighboring routing node for which the current routing node has received a hello message within a threshold period of time.

D.3. Route Cost

In one implementation, a routing node computes a route cost for each neighbor (310). For ease of illustration, in the examples below, the notation (j) signifies the current routing node and associated metrics/costs, and the notation (i) signifies a neighboring routing node and associated metrics/costs.

In one implementation, the route cost (j) at a given routing node (j) is calculated by multiplying the route cost (i) advertised by a given neighbor (i) in a hello message with the hop cost (j) of the routing node (j), as shown in the following equation:

$$\text{Route cost}(j,i) = \text{route\_cost}(i) * \text{hop\_cost}(j)$$

In one implementation, the route cost computed by the current routing node for a given neighbor represents a success packet delivery ratio that factors in all packet delivery ratios (e.g., QPDR and TPDR) at all hops from the routing node through the discovered route to the root node. The route cost may also be referred to as the end-to-end packet delivery ratio.

D.4 Hop Count

In one implementation, for each neighbor, each routing node computes a hop count (312), which is the number of routing nodes, or hops, through which a packet travels upstream from a given routing node to the root node. Simulation results show that the end-to-end throughput varies approximately inverse linearly with the number of hops on a given route. Accordingly, to maximize the end-to-end throughput, a routing protocol may reduce the number of hops a packet needs to travel.

As described above, a hello message from a given neighbor (i) provides the hop count of the route from the neighbor (i) to the root node. Accordingly, the hop count of the routing node (j) relative to the neighbor (i) would be the hop count (i) plus 1, as shown in the following equation:

$$\text{Hop\_count}(j,i) = \text{hop\_count}(i) + 1$$

D.5. Routing Metric

In one implementation, for each neighbor, each routing node computes a routing metric (314). In one implementation, the routing metric is based on the computed route cost (j) and the computed hop count (j), as shown in the following equation:

$$\text{Routing\_metric}(j) = (1 - \text{route\_cost}(j,i))^{\alpha} * (\text{hop\_count}(j,i))^{(1-\alpha)}$$

Alpha $\alpha$ is a user defined weighting factor between zero and unity, inclusive. Alpha $\alpha$ balances the hop count and the route cost. When alpha $\alpha$ is zero, the routing protocol essentially results in a minimum hop routing algorithm. In one implementation, a routing node starts to calculate its routing metric only after its hop count is known. Initially (e.g., at start up), both packet delivery ratios are set to 100% and the route cost is set to 0. Therefore, at the neighbor discovery phase, the routing algorithm is essentially minimum hop routing. Once the routing protocol enters the route maintenance phase and begins gathering statistics about itself and neighboring routing nodes, each routing node can measure its own packet delivery ratios and may choose a better route based on the newly calculated routing metrics.

In one implementation, each routing node selects a preferred neighbor based on the best routing metric value (316) for upstream packet transmission to the root node. In one implementation, the best routing metric value is the smallest value. In one implementation, the route cost(j) and hop count (j), derived from the route cost(i) and hop count(i) of the selected neighbor, becomes the new route cost and new hop count to be transmitted in hello messages to other neighbor routing nodes.

Since each selected neighbor in turn has a selected/preferred neighbor as a parent routing node, the cumulative selection process across the routing nodes in the wireless mesh effectively creates a hierarchical routing node configuration that can dynamically adjust with node failures and other changes, such as changes to the RF characteristics of the wireless environment. The routing nodes achieve end-to-end throughput by selecting hops (i.e., preferred neighbors) having optimal hop costs and reduced hop counts. The routing nodes also avoid heavily congested links and unreliable, interference-limited links as well as maximizing end-to-end throughput. Another advantage with embodiments of the present invention is that at any given time, traffic from a sender to a destination travels through the optimal route. Accordingly, neither the source nor the destination needs to maintain multiple routes at the same time.

While the implementations below are described in the context of a Tree-Based Routing (TBR) protocol, the metrics describe above and below may be applied to any mesh routing protocol and any route discovery protocols (e.g., reactive and proactive protocols). In one implementation, a TBR protocol has two phases: 1) a neighbor-discovery or route setup phase and 2) a route maintenance phase. In the neighbor-discovery phase, routing is performed based on the minimum hop count. By default, the packet delivery ratios are set to 100%. As such, a root node will have the highest high packet delivery ratios. Also, the hop count is initially set to invalid or null (i.e., 0). As such, the root node will not have a hop count and the hop count will increase as a given routing node becomes more distant from the root node. In one implementation, when a routing node does not have data packets to deliver, the routing node measures the link delivery ratio on hello messages. Therefore, at the neighbor discovery phase, the routing is essentially minimum hop routing. Once the routing protocol enters a route maintenance phase, each routing node can measure its own packet delivery ratios and may choose a better route based on the newly calculated routing metric.

E. Load Balancing

In a wireless mesh network, channel utilization decreases significantly with the increase of hop count. For instance, in a tree-based structure, if a hop-one link has a 50% utilization rate and there are 5 two-hop links, at most each two-hop link can have a 10% utilization rate on average, assuming each routing node is equipped with only one radio. Therefore, it may be advantageous to assign more bandwidth to the one-hop routing nodes than to the routing nodes that are two or more hops away from root node. In 802.11 networks, there are three contention parameters that can be configured to give some routing nodes higher priority than others. In the long term, routing nodes with higher priorities are given more bandwidth share than routing nodes with lower priorities.

As described above, routing nodes self-allocate bandwidth within a wireless network by dynamically modifying one or more contention parameters corresponding to one or more access classes. In one implementation, each routing node modifies its contention parameters only for lower access classes, such as data traffic (leaving intact the contention parameters corresponding to voice, video and other real-time traffic). In one implementation, the contention parameters computed by a given routing node is based on hop count, where hop count is the number of hops from the instant routing node to the root node in the hierarchical wireless mesh network.

In one implementation, bandwidth is allocated to each routing node in the mesh based on network layer informationhop count. As discussed below, the contention parameters for at least one access class are modified such that the routing nodes fewer hops from the root node transmit packets on average more aggressively than routing nodes that are more hops away from the root node. For example, routing nodes having a lower hop count (e.g., hop count=1) are given on average a higher throughput capacity/bandwidth than routing nodes having a higher hop count (e.g., hop count=3).

E.1. Contention Parameters

Implementations of the present invention modify at least one of the contention parameters associated with one or more priority or access classes. As discussed above, include three enhanced distributed controlled access (EDCA) media access control (MAC) layer parameters. One contention parameter is referred to as an arbitration interframe space (AIFS). In one implementation, AIFS defines an interval within which a routing node determines whether the media is idle before transmitting a packet. Another contention parameter is referred to as a minimum contention window ($CW_{min\_h}$). In one implementation, $CW_{min\_h}$ defines an initial upper limit of an interval range within which a routing node waits, or backs off, before transmitting a packet for the first time. The contention window (CW) may be doubled before retransmitting a packet that has failed to successfully transmit until CW reaches CWmax_h. Another contention parameter is referred to as a maximum contention window ($CW_{max\_h}$). In one implementation, $CW_{max\_h}$ defines a maximum upper limit to which CW may increase, where CW is a variable between CWmin_h and CWmax_h. In one implementation, CW is set to CWmin_h. As described above, in one implementation, every time there is a collision, CW may be doubled and may eventually reach CWmax_h. In one implementation, CW remains at CWmax_h until the data packet is either successfully transmitted or dropped after several retries. In one implementation, when the data packet is successfully transmitted, CW is re-set to CWmin_h. As described below, routing nodes in the wireless mesh self allocate bandwidth (for at least one access class) by computing one or more of these EDCA parameters for one or more access classes. In one implementation, these computations are executed after the routing node has selected a parent routing node in the hierarchal mesh and determined its hop count to the root node.

E.1.a. Arbitration Inter-Frame Space

As illustrated below, each routing node computes an AIFS value for an access class as a function of hop count (h). Computation of AIFS, according to one possible implementation, is shown in the following equation:

AIFS=min($h$*SlotTime+SIFS, DIFS), where

DIFS is the Distributed Inter-Frame Space;
SIFS is the Short Inter-Frame Space;
h is the hop count of a given routing node; and
SlotTime is the time length or interval associated with the contention window.

As shown in the equation above, in one implementation, AIFS for a given routing node increases with hop count, and is the lesser of DIFS or the sum of a hop-count dependent interval (h*SlotTime) plus a Short Interframe Space (SIFS) and Distributed Interframe Space (DIFS). In one implementation, the SlotTime is a hardware- or protocol-dependent interval. For example, the SlotTime may be 9 μs for the IEEE 802.11a standard or 20 μs for IEEE 802.11b protocol implementations. In one implementation, SIFS and DIFS may be defined by the IEEE 802.11 standard. For example, SIFS may be 16 μs for 802.11a or 10 μs for 802.11b, and DIFS may be 34 μs for 802.11a or 50 μs for 802.11b.

In one implementation, a smaller AIFS results in a smaller time interval within which a routing node determines whether the media is idle before transmitting a packet. As described in more detail below, if a routing node detects that the media is not idle (i.e., in a busy state), the routing node will back off, which on average will delay transmission of the packet. In one implementation, the potential length of the backoff or delay will increase as the hop count of the routing node increases. It may be desirable that routing nodes with a lower hop count have a smaller AIFS because, as described above, routing nodes with lower hop counts will generally get more traffic and are thus more likely to experience congestion. Thus, modifying the AIFS balances the load of the wireless network, because routing nodes with higher hop counts are more likely back off when the media is busy. Similarly, it is desirable that routing nodes that have acknowledgement messages to transmit have a smaller AIFS. If routing nodes receive acknowledgement messages sooner, routing nodes are less likely to erroneously retransmit packets, which may unnecessarily increase congestion.

E.1.b. Minimum and Maximum Contention Windows

As described above, in one implementation, the minimum contention window ($CW_{min\_h}$) defines an initial upper limit on the contention window CW within which a random backoff period is chosen, before transmitting a packet for the first time or before retransmitting a packet that has failed to successfully transmit. In one implementation, the maximum contention window ($CW_{max\_h}$) defines a maximum upper limit to which CW may increase. The following equations illustrate how each routing node may compute values for these contention parameters according to one possible implementation of the invention:

$$CW_{min\_h}=\min(2^{h+k}-1, CW_{min})$$

$$CW_{max\_h}=\min(2^{10-m+k}-1, CW_{max})$$

In the equations above, the resulting numerical value corresponds to microseconds. Accordingly, a resulting value of 7 corresponds to 7 microseconds. As describe above, h is the hop count. In one implementation, the terms k and m are user-defined constants (e.g., k>=2 and m<=5) that relate to the spacing, interference range, and radio range of the routing nodes, and the congestion levels of the root nodes. In one implementation, $CW_{min}$ and $CW_{max}$ are default values for a given access class, and may be defined by the IEEE 802.11 standard. For example, $CW_{min}$ is 15 for 802.11a or 31 for 802.11b. $CW_{max}$ is 1023 for 802.11a and 802.11b.

With regard to $CW_{min\_h}$, in one implementation, a routing node computes $CW_{min\_h}$ to be the lesser of $2^{h+k}-1$ or $CW_{min}$. For example, using an 801.11a protocol, where $CW_{min}$ is 15, if the routing node has a low hop count of 1 and k is 2, $CW_{min\_h}$ would be $2^{1+2}-1=7$. For a routing node with a higher hop count of 3, $CW_{min\_h}$ would be 15, since 15 is less than 31 μs ($2^{3+2}-1$). As illustrated above, $CW_{min\_h}$, in one implementation, increases exponentially with hop count up to a predefined value. Furthermore, a routing node with a lower hop count, and thus a lower $CW_{min\_h}$, will on average transmit packets more frequently than a routing node with a higher hop count. As a result, the contention parameter $CW_{min\_h}$ facilitates load balancing in the wireless mesh network, because $CW_{min\_h}$ enables routing nodes with lower hop counts to transmit packets more aggressively than routing nodes with higher hop counts.

In one implementation, $CW_{max\_h}$ may also be modified based on hop count. As described above, in one implementation, $CW_{max\_h}$ defines a maximum upper limit to which the contention window (CW) may increase, where $CW_{max\_h}$=min ($2^{10-m+k}-1$, $CW_{max}$). The term m is a user-defined constant that may vary depending on the type of packets to be transmitted (e.g., m<=5 for data traffic). For other traffic, such as voice traffic (VoIP), m may be a higher value (e.g., m<=8). In one implementation, a higher value for m may result in a lower $CW_{max\_h}$. As a result, routing nodes will on average transmit voice packets more aggressively than data packets.

In one implementation, modification of contention parameters based on hop count only applies to the lowest access class corresponding to data packets. For mesh networks intended to carry higher priority QoS traffic (e.g., voice/video) in the mesh network, the two user-defined parameters, k and m, should be set to values large or small enough such that data packets at any mesh AP have lower priority than QoS packets. There are three reasons as to why we choose not to manipulate EDCA parameters for QoS traffic. First, the majority of the network traffic still consists of data packets. Thus, in a wireless mesh network, data traffic is more likely to cause congestion. Second, it is often difficult to provide QoS guarantees for QoS traffic over wireless over mesh over unlicensed bands. Third, as defined in the IEEE 802.11e MAC protocol, voice and video packets already have aggressive CWmin and CWmax settings and the gaps between CWmin and CWmax are generally small. However, modification of contention parameters for additional access classes is still contemplated by the invention. Accordingly, while modifying contention parameters may be, in some implementations, applied primarily to data packets, modifying contention parameters may be applied to other types of traffic, such as VoIP traffic, and would still remain in the spirit and scope of the present invention.

FIG. 4 is a flow chart illustrating a process flow, according to one implementation of the present invention, associated with computing contention parameters. In one implementation, each routing node modifies its contention parameters as often as its hop count changes. In one implementation, a routing node re-computes contention parameters in response to an event. In one implementation, the event may be the receipt of a hello message. In another implementation, the event may be tied to selection of a new parent routing node (discussed above) that results in a change to the hop count corresponding to the routing node. Accordingly, upon the occurrence of some triggering event (402), a routing node determines if its hop count has changed (404). If the hop count has changed, the routing node computes one or more contention parameters (406).

The present invention has been explained with reference to specific embodiments. For example, while embodiments of the present invention have been described as operating in connection with IEEE 802.11 networks, the present invention can be used in connection with any suitable wireless network protocols. Furthermore, while the embodiments of the present invention disclose herein have been described in the context of hierarchical wireless mesh networks, the present invention may also apply to other types of networks that dynamically configure paths to destination nodes. Other embodiments will be evident to those of ordinary skill in the art. It is therefore not intended that the present invention be limited, except as indicated by the appended claims.

What is claimed is:

1. A routing node operative in a wireless mesh network comprising a destination node, the routing node comprising:
   one or more wireless network interfaces;
   one or more processors;
   a memory; and
   a routing node application, physically stored in the memory, comprising instructions operable to cause the one or more processors and the routing node to
      implement a contention-based media access mechanism operative to coordinate transmission over a wireless medium of wireless packets with other routing nodes in a hierarchical wireless mesh network including a root node, wherein one or more contention parameters influence operation of the contention-based media access mechanism;
      receive one or more messages from at least one of the other routing nodes, wherein the one or more messages each indicate a number of hops from the respective routing node that transmitted the one or more messages to the root node;
      compute a routing metric for each of the other routing nodes from which messages were received, wherein the routing metric is a function of at least the number of hops identified in a respective message transmitted by a corresponding routing node;
      select a parent routing node from the other routing nodes, from which the one or more messages were received based on the routing metric;
      determine a hop count based on the number of hops indicated in the message received from the selected parent routing node, wherein the hop count is the number of hops from the routing node through the selected parent node to the root node in the hierarchical wireless mesh network; and
      adjust one or more contention parameters based at least in part on the hop count.

2. The routing node of claim 1 wherein the one or more contention parameters comprise enhanced distributed controlled access (EDCA) parameters.

3. The routing node of claim 1 wherein at least one of the contention parameters is an arbitration interframe space (AIFS).

4. The routing node of claim 1 wherein at least one of the contention parameters is a minimum contention window.

5. The routing node of claim 1 wherein at least one of the contention parameters is a maximum contention window.

6. The routing node of claim 1 wherein the contention parameters correspond to a single access class.

7. The routing node of claim 1 wherein the contention parameters correspond to a plurality of access classes.

8. In a routing node operative in a wireless mesh network comprising a destination node, a method comprising:
   implementing a contention-based media access mechanism operative to coordinate transmission over a wireless medium of wireless packets with other routing nodes in a hierarchical wireless mesh network including a root node, wherein one or more contention parameters influence operation of the contention-based media access mechanism;
   receiving one or more messages from at least one of the other routing nodes, wherein the one or more messages each indicate a number of hops from the respective routing node that transmitted the one or more messages to the root node;
   computing a routing metric for each of the other routing nodes from which messages were received, wherein the routing metric is a function of at least the number of hops identified in a respective message transmitted by a corresponding routing node;
   selecting a parent routing node from the other routing nodes, from which the one or more messages were received based on the routing metric;
   determining a hop count based on the number of hops indicated in the message received from the selected parent routing node, wherein the hop count is the number of hops from the routing node through the selected parent node to the root node in the hierarchical wireless mesh network; and adjusting one or more contention parameters based at least in part on the hop count.

9. The method of claim 8 wherein the one or more contention parameters comprise enhanced distributed controlled access (EDCA) parameters.

10. The method of claim 8 wherein at least one of the contention parameters is an arbitration interframe space (AIFS).

11. The method of claim 8 wherein at least one of the contention parameters is a minimum contention window.

12. The method of claim 8 wherein at least one of the contention parameters is a maximum contention window.

13. The method of claim 8 wherein the contention parameters correspond to a single access class.

14. The method of claim 8 wherein the contention parameters correspond to a plurality of access classes.

15. The routing node of claim 1 wherein the one or more contention parameters are adjusted to increase access to the wireless medium as the hop count decreases.

16. The routing node of claim 1 wherein the one or more contention parameters are adjusted to provide the routing node with more transmit capacity of the wireless medium as the hop count decreases.

17. The method of claim 8 wherein the one or more contention parameters are adjusted to increase access to the wireless medium as the hop count decreases.

\* \* \* \* \*